United States Patent [19]

Meeussen et al.

[11] 3,829,610

[45] Aug. 13, 1974

[54] APPARATUS FOR SIMULTANEOUS REPRODUCTION OF VISIBLE AND AUDIBLE INFORMATION

[75] Inventors: Louis Achilles Meeussen, Moertsel/Antwerpen, Belgium; Friedrich Bestenreiner, Grunwald; Hans-Peter Huber, Munich, both of Germany

[73] Assignee: AGFA-Gevaert Aktiengesellschaft, Leverkusen, Germany

[22] Filed: May 23, 1972

[21] Appl. No.: 256,095

[30] Foreign Application Priority Data

May 26, 1971 Germany .......................... 2126075

[52] U.S. Cl. .......................................... 178/6.6 A

[51] Int. Cl. .......................................... H04n 5/76

[58] Field of Search ...... 178/6.6 A, 6.6 DD, 6.6 FS, 178/5.6, 6.7 R; 179/100.3 V, 100.4 ST

[56] References Cited

UNITED STATES PATENTS

| | | | |
|---|---|---|---|
| 1,776,097 | 9/1930 | Baird | 178/6.6 A |
| 1,787,919 | 1/1931 | Watson | 178/6.6 A |
| 1,841,540 | 1/1932 | Leeming | 178/6.6 A |
| 2,005,914 | 6/1935 | Freund | 178/6.6 A |
| 3,404,224 | 10/1968 | Revelo et al. | 178/5.6 X |
| 3,649,753 | 3/1972 | Kinjo et al. | 178/6.6 DD |

*Primary Examiner*—Raulfe B. Zache
*Attorney, Agent, or Firm*—Michael S. Striker

[57] ABSTRACT

Apparatus for simultaneous reproduction of audible and visible information employs a rotary disk having several concentric tracks of recorded visible information and several concentric helical sound grooves or a single helical sound groove with several sound sequences super-imposed upon each other in accordance with the carrier frequency method. The sound reproducing system has one or more sound heads which are movable axially and radially of the disk into register with the outer ends of selected sound grooves or into register with the outer end of the single sound groove. The image reproducing system has one or more heads movable axially and radially of the disk into register with selected tracks. Each such track may consist of a helical groove which can be scanned to reproduce a series of images or an endless groove which can be scanned to reproduce a still image. The endless groove may comprise portions of different optical density, and each head of the image reproducing system then employs a light source which can be trained upon a selected endless groove to emit a light beam which is modified by portions of the scanned endless groove prior to impinging on a photoelectrcic transducer.

20 Claims, 7 Drawing Figures

APPARATUS FOR SIMULTANEOUS REPRODUCTION OF VISIBLE AND AUDIBLE INFORMATION

BACKGROUND OF THE INVENTION

The present invention relates to image and sound reproducing apparatus, and more particularly to improvements in combined image or sound reproducing apparatus which can be utilized for educational, training, recreational, advertising, display and analogous purposes. Still more particularly, the inventions relates to apparatus for simultaneous reproduction of still pictures or moving pictures and related sequence or sequences of sounds, for example, to explain the meaning and/or nature of the produced image or images.

It is already known to provide a didactic or training apparatus with means for projecting the images of a series of diapositives and with means for simultaneously reproducing sound from a single sound track or from a series of discrete sound tracks. Discrete sound tracks can be provided on or associated with each diapositive so that the recorded audible information is reproduced simultaneously with the viewing of the respective diapositive. Alternatively, the sound can be recorded on a single track of considerable length and the apparatus is then furnished with a suitable synchronizing system which automatically reproduces the sound recorded on that portion of the elongated track which is associated with a selected diapositive.

It is also known to provide motion picture film with a magnetic or light sound track so that the film can be used for simultaneous storage of audible and visible signals. A drawback of all such apparatus is that the recording of information is very expensive, expecially if the diapositives and/or the film with associated sound track or tracks must be furnished in large quantities. Moreover, the apparatus for reproduction of such information are very expensive and complex so that they must be manipulated by experts. Also, the flexibility of such apparatus is unsatisfactory so that they failed to find widespread acceptance by educational and similar institutions.

It is further known to record audible and visible information on disk-shaped record carriers, the so called image disks having helical grooves and being designed to rotate at a high speed of about 3,000 RPM. The groove is scanned by a special head to furnish signals which are used to produce images on the screen of a television receiver. An advantage of image disks is that they can be reproduced in large quantities and at a reasonable cost from a single matrix. However, the presently known image disks are not suited for use in educational institutions because they invariably store a single continuous series of visible and audible signals which means that a large number of different disks is normally needed for a single lecture or program.

SUMMARY OF THE INVENTION

An object of the invention is to provide a novel and improved disk which is capable of storing information for reproduction of a number of discrete images or a number of image sequences with associated audible information and which allows for selective reproduction of images and/or sound.

Another object of the invention is to provide a novel apparatus which can be used for reproduction of audible and visible information stored on the improved disk.

A further object of the invention is to provide a simple, compact, rugged and easy-to-handle apparatus which can be used for reproduction of visible and audible information stored on a rotary disk, which allows for repeated reproduction of selected visible and audible information, and which can be designed to reproduce information in a predetermined sequence or in a sequence which is decided upon while the apparatus is in actual use.

A feature of the invention resides in the provision of an apparatus for simultaneously reproducing visible and audible information, particularly an apparatus which can be used for didactic or analogous purposes. The apparatus comprises a disk having at least one first track of recorded visible information and at least one second track of recorded audible information with one of the tracks located radially inwardly of the other track, a turnable or analogous means for rotating the disk at a predetermined speed, image reproducing means including at least one first head which is preferably movable axially and radially of the disk and serves to scan the first track, sound reproducing means including at least one second head which is preferably also movable radially and axially of the disk and serves to scan the second track simultaneously with scanning of the first track by the first head, and means for supporting the heads.

The novel features which are considered as characteristic of the invention are set forth in particular in the appended claims. The improved reproducing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
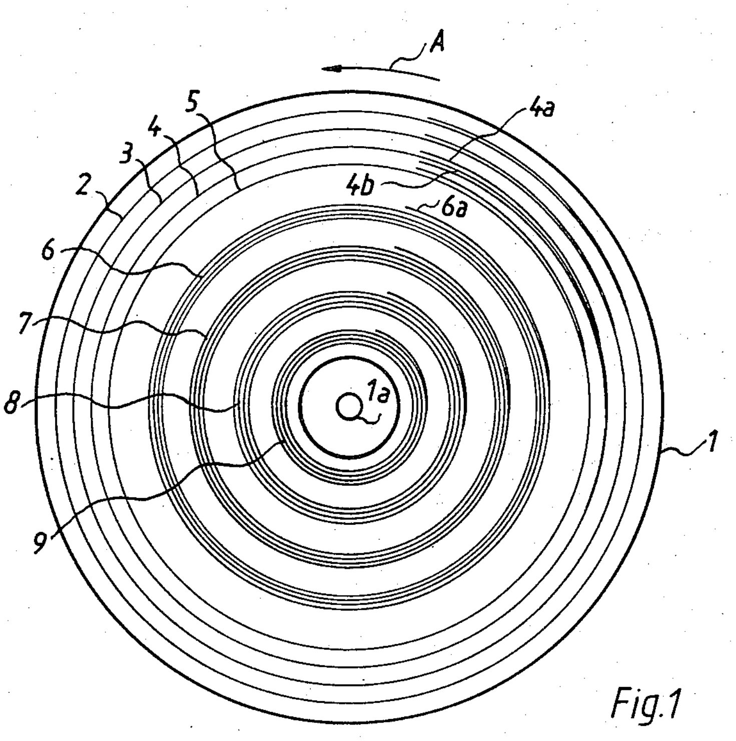
FIG. 1 is a plan view of a disk which embodies one form of the invention.

FIG. 1 illustrates a disk 1 having a centering hole 1a for the mandrel 30 (FIG. 3) of a turntable 29. The outer portion of one major surface of the disk 1 is provided with concentric annular tracks 2, 3, 4, 5 of recorded visible information each of which is a circumferentially complete groove. The surface bounding each track is provided with minute unevennesses which can be scanned by a head of the image reproducing system in a manner known from the art of phonograph records to furnish a sequence of signals for reproduction of a still image on the screen of a television receiver, not shown. The technique of reproducing such information is well known from the art. The signals are converted into video signals of varying brightness and are recorded, line-by-line, on the picture tube of a television receiver. It is assumed that the disk 1 is to rotate at 3,000 RPM which suffices to reproduce on the entire screen a half image in response to a full revolution of the disk. By suitable shifting in accordance with the so-called interleaved scanning method, one obtains a normal television image of satisfactory quality. The head which scans a selected track 2, 3, 4 or 5 remains at a constant distance from the center of the disk 1 so that the same image is reproduced again and again in response to each revolution of the disk, as long as the head retains its position and as long as the turntable 29 continues to drive the disk. It will be noted that the disk 1 of FIG. 1 can be used for the reproduction of four different images but it is evident that the number of tracks of recorded visible information can exceed or can be less than four.

In order to facilitate convenient and rapid alignment of the head with a selected track 2, 3, 4 or 5, the illustrated major surface of the disk 1 is provided with means for automatically guiding the head into register with a selected track. Such means includes two helical guide grooves for each of the four tracks (see the guide grooves **4*a*, 4*b* for the track 4 of FIG. 1) which converge toward each other counter to the direction (arrow A) of rotation of the disk 1 on the turntable 29 and flank a portion of the respective track. Thus, once the head is placed between the guide grooves 4*a*, 4*b* and the disk 1 begins to rotate in a counterclockwise direction, as viewed in FIG. 1, the head is automatically compelled to move into accurate register with the track 4, preferably at a point which corresponds to the end of an image writing cycle to avoid the possibility of adversely influencing the quality of selected image due to eventual instability of the head during travel along one of the guide grooves 4a, 4b into register with the track 4**.

The inner portion of the illustrated major surface of the disk 1 is provided with four concentric sound tracks 6, 7, 8 and 9 each constituting a helical sound groove having several convolutions. The overall length of each sound track determines the length of the interval during which a sound head which scans a selected sound track reproduces audible information while the disk 1 rotates in the direction indicated by the arrow A. The inner end of each of the sound tracks 6–9 is preferably designed to cause the generation of a signal which is transmitted to an evaluating device in the sound reproducing system of the apparatus for the purpose to be described below. The distance between the track 2 and the outer end of the associated sound track 6 is the same as that between the tracks 3, 7 or 4, 8 or 5, 9.

The circumferentially complete tracks 2–5 can be replaced by other forms of tracks of recorded video information. For example, each of the image tracks 2–5 can constitute a helical groove having several convolutions and being adapted to be scanned by a suitable head for reproduction of a series of several recorded images rather than a single image. Each such series of images can represent a sequence of different stages of movement of an object or being. Of course, the head which tracks helical image grooves must be mounted for movement radially of the disk 1 while the latter rotates with the turntable 29. The radial movement of the head must be properly synchronized with the RPM of the disk 1 and its speed is also a function of the distance between adjoining convolutions of the tracked image groove. As a rule, the distance between the convolutions of helical image grooves will be identical with the distance between the convolutions of the sound tracks 5–9 so as to insure that the head which scans a helical image groove moves radially at the same rate as the head which scans the associated sound track 6, 7, 8 or 9. If the disk 1 is provided with helical image grooves, the scanning of the outer end of each helical image groove preferably results in the generation of a first signal by the image reproducing system of the apparatus, and such signal initiates the radial movement of the image groove scanning head toward the centering hole **1*a*** of the disk. Also, the scanning of the inner end of a helical image groove preferably results in the generation of a second signal which effects a termination of radial movement of the image groove scanning head and can also effect a return movement of such head to a predetermined starting position.

Figure 2:
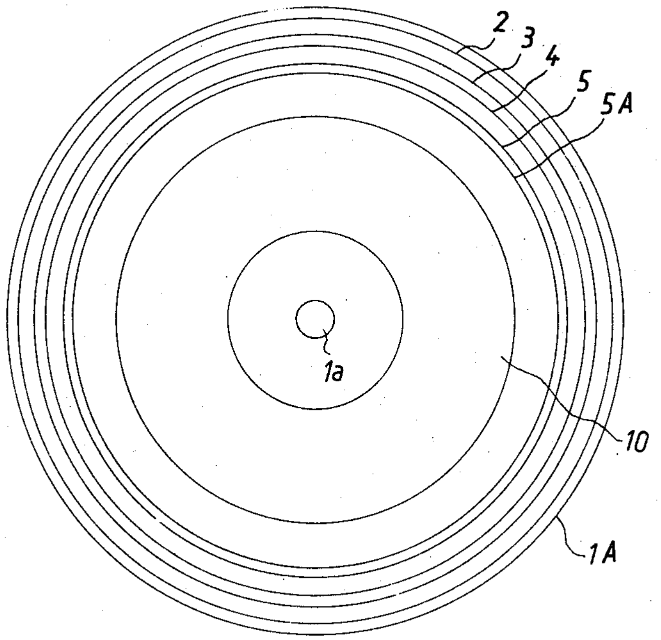
FIG. 2 is a plan view of a modified disk.

FIG. 2 illustrates a modified disk 1A having a centering hole 1a and five circumferentially complete or helical image tracks 2, 3, 4, 5, 5A close to its marginal portion. The helical sound tracks 6–9 of FIG. 1 are replaced with a single helical sound track 10 which records five or more sequences of sound signals superimposed upon each other in accordance with the carrier frequency method. The maximum frequency of the sound signals is about 5 mHz per second at the aforementioned RPM of 3,000. Such frequency range is not needed for a satisfactory reproduction of sound. It is therefore possible to use a single sound track for recording of signals within a frequency range which, by resorting to the well known carrier frequency modulation method, allows for superimposition of a large number of sound signal sequences. Known filtering systems in the sound reproducing system can be employed to switch to reproduction of any one of several superimposed sound sequences.

Figure 3:
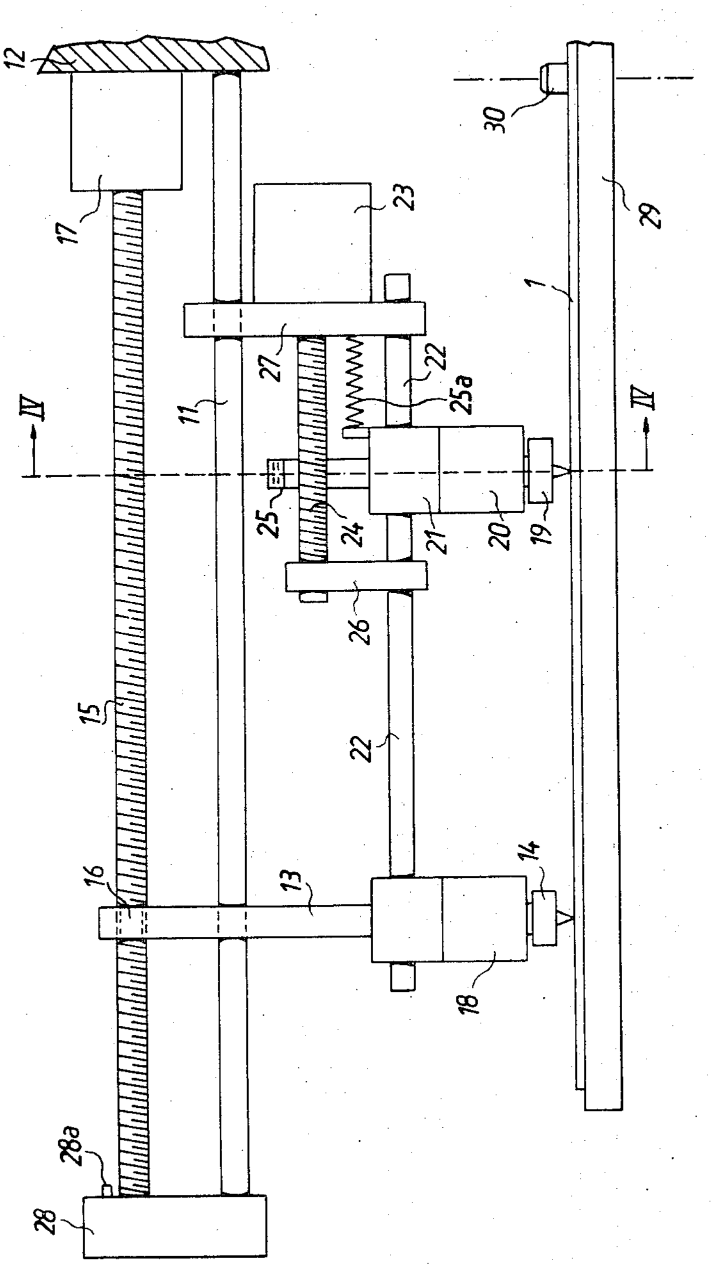
FIG. 3 is a fragmentary vertical sectional view of an apparatus for the reproduction of information which is stored on disks of the type shown in FIG. 1.

Certain details of an apparatus which can be used to reproduce sounds and images in response to scanning of the disk 1 are shown in FIG. 3. The apparatus comprises a stationary main support 12 having an elongated supporting arm 11 for two heads 14 and 19 which are adjustable axially and radially of the disk 1 on the turntable 29. The arm 11 extends substantially radially of the turntable 29 and is parallel to the plane of the disk 1. A vertical holder 13 for the image track scanning head 14 is movable lengthwise of the supporting arm 11 and is provided at its upper end with a spindle nut 16 in mesh with an elongated feed screw 15 extending in parallelism with and above the supporting arm 11. The feed screw 15 can be driven by a reversible electric motor 17 which is mounted on the support 12. The outer end of the feed screw 15 is journalled in a cross-head 28 at the left-hand end of the supporting arm 11. The head 14 is movable up and down relative to its holder 13 by means of an electromagnet 18. If desired, the electromagnet 18 can be replaced by other lifting means, such as a pneumatically operated cylinder and piston unit (not shown).

The sound head 19 is movable up and down by a second electromagnet 20 or an analogous lifting device which is mounted on a reciprocable carriage 21. The carriage 21 is mounted for movement along an elongated tie rod 22 or analogous guide means extending in parallelism with the supporting arm 11. The tie rod 22 is preferably of non-circular outline (see FIG. 4) so as to prevent any turning of the carriage 21, electromagnet 20 and sound head 19. The tie rod 22 constitutes a mechanical coupling between the carriage 21 and the holder 13 for the head 14. This tie rod supports two bearing members or stops 26, 27 which rotatably support a horizontal feed screw 24. The latter can be rotated by a synchronous motor 23 which is mounted on the bearing member 27. The member 27 is secured to the supporting arm 11 and to the tie rod 22. The bearing member 26 is secured only to the tie rod 22. An upwardly projecting extension of the sound head 19 is provided with a segmental spindle nut 25 (see particularly FIG. 4) which meshes with the feed screw 24 when the sound head 19 dwells in its lower end position but is disengaged from the feed screw 24 when the sound head 19 is lifted by the electromagnet 20. A helical spring 25a is attached to the carriage 21 and bearing member 27 to automatically return the carriage 21 into abutment with the bearing member 26 when the spindle nut 25 is disengaged from the feed screw 24. Such position of the carriage 21 corresponds to a starting position of the sound head 19; the sound head 19 is then located exactly above the outer end of that sound track 6, 7, 8 or 9 which is associated with the image track (2, 3, 4 or 5) below the head 14. When the spindle nut 25 meshes with the feed screw 24 and the motor 23 rotates the feed screw 24 to move the carriage 21 in a direction to the right, as viewed in FIG. 3, the spring 25a stores energy and is free to expand in order to move the carriage 21 back against the bearing member 26 as soon as the electromagnet 20 is energized or deenergized to lift the spindle nut 25 above and away from the feed screw 24. Such movement of the spindle nut 25 is shared by the sound head 19 which is then lifted above and away from the disk 1 on the turntable 29. The distance between the bearing members 26, 27 preferably equals the distance between the outermost convolution of the outermost sound track 6 and the innermost convolution of the innermost sound track 9 on the disk 1.

The reversible motor 17 serves as a means for selecting that image track which is to be scanned by the head 14. To this end, the control circuit of the motor 17 preferably includes two actuating elements in the form of knobs or the like one of which must be depressed or otherwise moved in order to start the motor 17 in a direction to move the holder 13 for the head 14 toward the crosshead 28 and the other of which is depressed in order to cause the motor 17 to move the holder 13 in a direction toward the main support 12. The feed screw 15 and/or the supporting arm 11 can be provided with a suitable scale having graduations serving to indicate those positions of the holder 13 in which the head 14 respectively registers with the tracks 2, 3, 4 and 5. It is also possible to provide automatic means for arresting the holder 13 when the head 14 moves into register with a selected image track. For example, such automatic means may include a wheel (not shown) which is rotated by the motor 17 through the intermediary of a suitable transmission so that it completes a full revolution in response to movement of the head 14 from register with the outermost track 2 into register with the innermost track 5. The wheel can carry several electric contacts in a manner known from the art of commutator controls, and the control system of the apparatus may include several pushbuttons or the like, one for each of the four positions of the head 14. By depressing the selected pushbutton, the operator insures that the wheel automatically arrests the motor 17 when the head 14 moves into register with the selected track 2, 3, 4 or 5 on the disk 1. A contact on the wheel then engages a stationary contact (or is disengaged from a stationary contact) to energize (or deenergize) a relay which opens the circuit of the motor 17 at the exact moment when the head 14 assumes the desired position. The exact construction of such automatic means for arresting the motor 17 forms no part of the present invention. If the depression of a pushbutton which has caused the holder 13 to move toward the support 12 is followed by depression of a pushbutton which is to effect a movement of the holder 13 back to the position shown in FIG. 3, a suitable reversing device in the control circuit automatically changes the direction of rotation of the motor 17 which is thereupon arrested in a fully automatic way as soon as the head 14 reaches the position shown in FIG. 3. The arrangement may be such that the motor 17 is invariably started to rotate the feed screw 15 in a direction to move the holder 13 radially outwardly. The control circuit for the motor 17 may be installed in or on the crosshead 28 and may include a switch (see the movable contact 28*a*) which is actuated by the spindle nut 16 in the leftmost position of the holder 13. The thus actuated switch including the contact 28*a* automatically reverses the direction of rotation of the motor 17 which is arrested when the head 14 moves into register with a selected image track.

The means for rotating the turntable 29 at a predetermined speed (preferably in such a way that the deviations of the disk RPM from an optimum RPM are negligible) is of known design and is not shown in FIG. 3. Such drive means may include a suitable speed governor.

Figure 4:
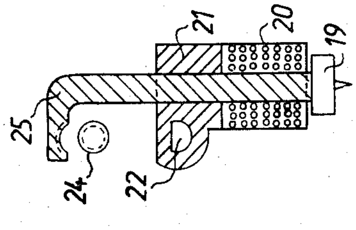
FIG. 4 is a fragmentary sectional view as seen in the direction of arrows from the line IV—IV of FIG. 3.

The operation of the apparatus embodying the structure of FIGS. 3 and 4 is as follows:

In the first step, the operator causes the motor 17 to move the head 14 into register with the selected track 2, 3, 4 or 5 on the disk 1. This disk 1 rests on the turntable 29. The tolerances in the initial placing of the head 14 into register with a selected image track are rather wide; they may approximate or nearly equal the radial distance between two neighboring tracks 2–3 or 3–4 or 4–5. If the initial setting of the head 14 is unsatisfactory, the one or the other helical guide groove (see the guide grooves 4*a*, 4*b* of FIG. 1) automatically causes the head 14 to move into exact register with the selected track. The maximum distance between the helical guide grooves for each of the tracks 2–5 preferably equals the distance between a pair of adjoining tracks. A very short angular displacement of the turntable 29 is necessary in order to cause the inner or the outer helical guide groove to move the head 14 into exact register with the selected track. Similar helical guide grooves can be provided for the helical sound tracks 6–9. Of course, each sound track can be associated with a single guide groove which is located radially outwardly of the outer end of the respective sound track (see the helical guide groove 6a for the outermost sound track 6 of FIG. 1).

During selection of an image track, the electromagnet 20 maintains the sound head 19 in the raised position. Therefore, the segmental spindle nut 25 dwells in the position shown in FIG. 4 and is out of mesh with the feed screw 24. Also, the spring 25*a* is free to maintain the carriage 21 in abutment with the bearing member or stop 26. When the electromagnet 20 is deenergized, the head 19 descends and enters the outer end of that sound track (e.g., the sound track 6) which is associated with the selected image track (it is assumed that the operator has selected the outermost image track 2). At the same time, the segmental spindle nut 25 moves into mesh with the feed screw 24. As the head 14 continues to scan one and the same image track so that the image reproducing system of the apparatus produces on the screen of the television receiver a still image of a selected subject, the motor 23 drives the feed screw 24 which causes the carriage 21 to move along the tie rod 22 at a speed which is necessary to move the head 19 along the helical sound track therebelow whereby the carriage 24 gradually stresses the spring 25*a*. The sound reproducing system of the apparatus thereby reproduces a sequence of sounds, such as a recorded analysis or explanation of the reproduced still image.

When the sound head 19 reaches the inner end of the adjacent sound track, it produces a signal which results in energization of the electromagnet 20 so that the head 19 is automatically lifted off the disk 1 on the turntable 29. This moves the spindle nut 25 out of mesh with the feed screw 24 whereby the spring 25*a* expands and returns the carriage 21 into abutment with the bearing member 26. If desired, the signal which is produced when the sound head 19 scans the inner end of a helical sound track can be used to automatically lift the sound head 19 by way of the electromagnet 20 so that the sound head 19 returns to its starting position and to thereupon automatically deenergize the electromagnet 20 with the result that the sound head 19 reengages the previously tracked sound track and the sequence of sounds is reproduced again. This might be useful if the apparatus is used for display or advertising purposes.

If each of the sound tracks 5–9 on a disk 1 contains several superimposed sequences of recorded audible information, the scanning by the head 19 of the end of the sound track therebelow can result in the generation of a signal for automatic resetting of the head 19 into register with the same sound track accompanied by a switch in frequency so that the head 19 begins to reproduce a different sequence of sounds while the head 14 continues to furnish signals which cause the projection of the same still image which was being reproduced during the preceding scanning of the associated sound track.

If the image tracks 2–5 are helical grooves each of which can be scanned for the reproduction of several images, for example, of a relatively small number of images representing different stages of movement of an object or animal, the scanning of the outer end of each helical image groove results in the generation of a signal which causes the motor 17 to rotate the feed screw 15 at a reduced speed in a direction to move the holder 13 toward the mandrel 30 at the exact rate which is required to move the head 14 along the helical image groove therebelow. Thus, the speed of the feed screw 15 is then synchronized with the speed of the turntable 29 in order to gradually move the head 14 radially inwardly through a distance corresponding to that between two neighboring convolutions of a helical image groove for each full revolution of the disk 1.

The scanning of the inner end of each helical image groove results in the generation of a different signal which arrests the motor 17. A single disk may carry one or more endless image grooves and one or more helical image grooves, and the motor 17 can be used to move the head 14 (in raised position of this head) into register with a selected endless image groove or into register with the outer end of a selected helical image groove.

If the head 14 scans a helical image groove, it is operatively connected with the sound head 19 in such a way that the motor 23 is at a standstill and the carriage 21 abuts against the bearing member 26. The holder 13 then moves the parts 19–25, 25*a*, 26–27 at the exact speed at which the head 14 moves toward the mandrel 30.

An important advantage of the disk 1 or 1A whereon the recorded visible information is stored separately from recorded audible information is that the reproduction of visible information can be accompanied by reproduction of any one of two or more sound sequences, or vice versa. This is of particular advantage when the apparatus is used for educational purposes so that, while looking at the same image or images, pupils of different age groups can listen to different explanations. Analogously, a group of more gifted pupils can listen to a complex explanation and a group of less gifted pupils can listen to a simpler explanation while both groups of pupils observe the same image or the same series of images.

Means for rotating the disks at 3,000 RPM is preferred if the recorded visible information is to be reproduced on a television screen because one revolution of the disk then corresponds to a scanning cycle of a conventional television receiver which, as known, reproduces fifty half images per second. Thus, if each of the tracks 2–5 shown in FIG. 1 is an endless groove, the head 14 can scan a selected track for any desired period of time, for example, for a period which is required by the sound head 19 to complete the scanning of an entire helical sound groove. The length of each sound groove can be selected with a view to necessitate a substantial number of revolutions before the head 19 completes the scanning of such sound groove from its outer end and all the way to the inner end.

The disk 1 or 1A can be provided with tracks of recorded visible and audible information at one of tis major surfaces or at both surfaces.

Figure 5A:
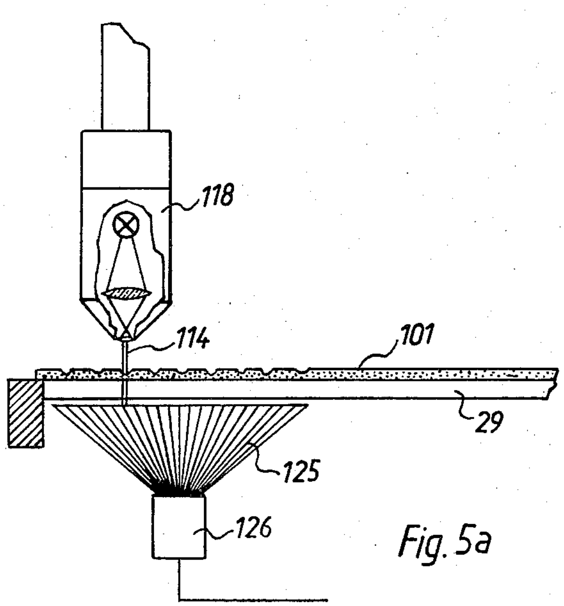
FIG. 5*a* is a fragmentary vertical sectional view of a third apparatus.
Figure 5:
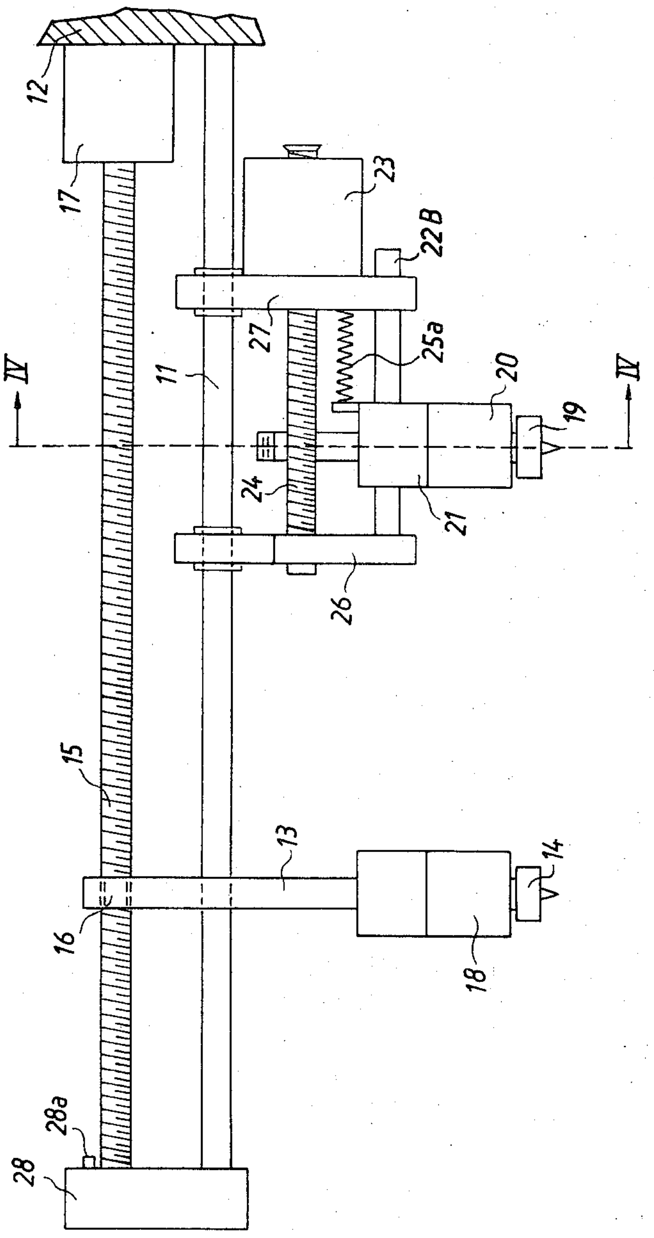
FIG. 5 is a fragmentary vertical sectional view of an apparatus for the reproduction of information which is stored on disks of the type shown in FIG. 2.

FIG. 5 illustrates a second apparatus adapted to be used for reproduction of information which is recorded on a disk 1A. All such parts of the second apparatus which are identical with or clearly analogous to the corresponding parts of the apparatus shown in FIGS. 3–4 are denoted by similar reference characters. The main difference between the two apparatus is that the bearing members 26, 27 of FIG. 5 are rigidly secured to the supporting arm 11 and that the tie rod 22 is replaced with a shorter tie rod 22B which is not rigid with the holder 13 for the head 14. The extent to which the sound head 19 can move between the bearing members 26, 27 corresponds to the width of the single helical sound track 10 on the disk 1A. Each of the heads 14, 19 is movable independently of the other head. The only operative connection between the two heads is that which automatically selects one of several superimposed sound sequences on the track 10 in response to movement of the head 14 into register with a selected image track. This can be accomplished by resorting to suitable control means or frequency selector means in the circuit of the motor 17 or in the circuit of the aforementioned wheel which is rotated by the motor 17. The control means selects the appropriate frequency in automatic response to movement of the head 14 into register with the corresponding image track.

The signals furnished by the heads 14, 19 during scanning of a selected image track and the track 10 are transmitted to conventional amplifiers and thence to a television receiver in a manner not forming part of the present invention. The reproduction of such information will present no problems to persons skilled in this art.

It is also within the purview of the invention to use disks 101 (FIG. 5*a*) whereon the information pertaining to one or more images is recorded in the form of an endless track 102 or a helical track having portions of varying optical density whereby the scanning of each track portion of a given optical density results in the generation of a given video signal. For example, the disk 101 may be made of a partially light transmitting material and the image track portions of different optical density then constitute portions of different thickness of the light transmitting disk. Disks of such type can be produced by stamping whereby the light absorbing effect of a relatively thick portion of the image track is more pronounced than that of a relatively thin track portion.

The scanning of a disk 101 having one or more image tracks of the just described character is carried out in an apparatus which employs a head 114 having a light source 118 adapted to emit a highly condensed light beam which impinges upon a light collecting and conducting device 125 located at a level below the partially light transmitting disk. The light collecting and conducting device 125 has a width which corresponds to the combined width of all image tracks and the light beam emitting head can be moved radially of the disk 101 in the same way as described in connection with the head 14 of FIG. 3. For example, the light collecting and conducting device 125 may include a funnel-shaped bundle of filaments which convey light to a stationary photosensitive transducer 126 of known design. If the just described disk 101 carries several discrete sound tracks (such as the sound tracks 6–9 of FIG. 1) and several endless image grooves having portions of different optical density, the light emitting head 114 is coupled to the sound head to move into register with a given image track in response to movement of the sound head into register with the outer end of a selected sound groove. The light emitting head 114 is then lowered toward the adjacent image track and is held against radial movement by a suitable braking or arresting device which can be actuated by the electromagnet 18 as soon as the latter completes the movement of light emitting head 114 to its lower end position immediately above the selected image track. When the light emitting head 114 is lifted above the disk 101, a spring or the like biases it against a stop which is connected with the carriage for the sound head so that the distance between the two heads is then reduced to equal that between an image track and the outer end of the associated sound groove. Such lifting of the light emitting head 114 can take place in automatic response to generation of a signal which is produced when the sound head tracks the inner end of the sound groove therebelow.

An important advantage of scanning an image track by a light emitting head 114 is that the image track 102 is not subjected to any wear because the light emitting head 114 need not be moved into direct contact with the rotating disk 101. This renders it possible to reproduce a still image for any selected period of time without any adverse effect upon an image track having portions of different optical density.

Figure 6:
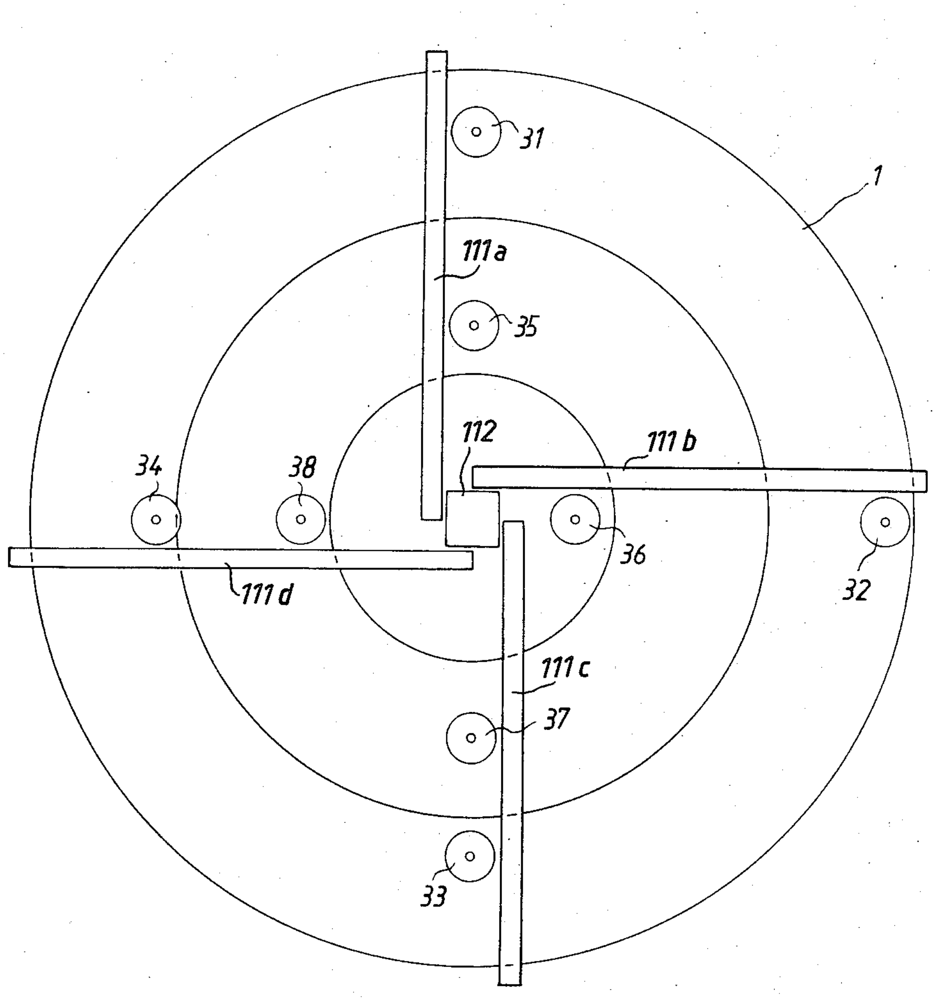
FIG. 6 is a diagrammatic plan view of a further apparatus.

FIG. 6 illustrates a further modification of the apparatus of FIGS. 3 and 4. The disk 1 is assumed to be mounted on a turntable (not shown) which can be rotated at a level below several pairs of image track scanning heads and sound heads, for example, four pairs which respectively include image track scanning heads 31, 32, 33, 34 and sound heads 35, 36, 37, 38. The reference characters 111*a*, 111*b*, 111*c*, 111*d* denote four supporting arms for the head pairs 31–35, 32–36, 33–37, 34–38. The arms 111*a*–111*d* extend outwardly from a main support 112. The arms 111*a*–111*d* may but need not be equidistant from each other, as considered in circumferential direction of the turntable, and their number may be greater or less than four, depending on the maximum number of image and sound tracks or disks which are to be used in the apparatus of FIG. 6. Each pair of associated heads can be moved independently of the other pairs of heads, and each such pair can reproduce visible and audible signals to a separate television receiver, not shown. The means for moving the heads along the respective supporting arms with and/or relative to each other may be constructed in a manner as described above in connection with FIGS. 3–5 and in connection with apparatus for the reproduction of information from disks having image tracks with portions of different optical density.

By using discrete television receivers for each pair of heads, it is possible to simultaneously scan two or more image tracks and associated sound tracks and to set up different television receivers in different rooms, for example, in different classrooms. Furthermore, the apparatus of FIG. 6 renders it possible to scan a single image track by two or more image reproducing heads (e.g., by the heads 31, 33 and 34) and to simultaneously cause the associated sound heads 35, 37, 38 to scan different super-imposed sequences of recorded sound on a single sound track. In this way, the pupils in a lower grade can observe the same image as the pupils in one or more higher grades but the reproduced audible information is different for each grade, i.e., the explanations heard by pupils in a higher grade are more detailed or more complex than those which can be heard by pupils in a lower grade. Analogously, the pupils of approximately the same age can be divided into two or more groups in accordance with their capabilities and each group sees the same image or the same series of images but hears a different explanation. Still further, while the less receptive pupils will listen to the least sophisticated explanations or instructions, the more advanced pupils can switch from elementary explanations to more detailed explanations and to still more detailed or complex explanations as soon as they have absorbed a simpler lecture.

The apparatus of FIG. 6 allows for many additional modifications of the instructional program with the help of disks 1, 1A or similar disks. For example, one of the four pairs of heads can be held in reserve in the event of failure of another pair of heads. Also, the number of pairs of heads need not equal the number of image and sound tracks on a disk.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and, therefore, such adaptations should and are intended to be comprehended within the meaning and range of equivalence of the claims.

What is claimed as new and desired to be protected by Letters Patent is set forth in the appended claims:

1. Apparatus for simultaneously reproducing visible and audible information, particularly for educational and analogous purposes, comprising a disk having at least one first track of recorded visible information and at least one second track of recorded audible information, said first track constituting an endless groove, said first and second tracks being spaced from each other as considered in the radial direction of said disk; means for rotating said disk; image reproducing means including at least one first head arranged to scan said first track, said disk further comprising at least one helical guide groove merging into said endless groove to move said first head into register with said endless groove in response to rotation of said disk when said first head is placed between said grooves; sound reproducing means including at least one second head arranged to scan said second track simultaneously with scanning of said first track by said first head; and means for supporting said first and second heads.

2. Apparatus as defined in claim 1, wherein said endless groove includes a portion corresponding to the end of an image writing cycle and located in the region of the merger of said guide groove into said endless groove.

3. Apparatus for simultaneously reproducing visible and audible information, particularly for educational and analogous purposes, comprising a disk having a plurality of discrete concentric first tracks of recorded visible information and a single second track of a plurality of sound sequences superimposed upon each other in accordance with the carrier frequency method, said first tracks and said second track being spaced from each other as considered in the radial direction of said disk; means for rotating said disk; image reproducing means including at least one first head arranged to scan said first tracks; sound reproducing means including at least one second head arranged to scan said second tracks simultaneously with scanning of a first track by said first head; and means for supporting said first and second heads.

4. Apparatus as defined in claim 3, wherein said first tracks surround said second track and wherein said first head is movable relative to said supporting means into register with selected first tracks.

5. Apparatus as defined in claim 4, wherein said sound reproducing means is arranged to set said second head for the scanning of different sound sequences in response to movement of said first head into register with different first tracks.

6. Apparatus for simultaneously reproducing visible and audible information, particularly for educational and analogous purposes, comprising a disk having at least one first track of recorded visible information and at least one second track of recorded audible information, said first and second tracks being spaced from each other as considered in the radial direction of said disk; means for rotating said disk; image reproducing means including at least one first head arranged to scan said first track; sound reproducing means including at least one second head arranged to scan said second track simultaneously with scanning of said first track by said first head; means for supporting said first and second heads; means for moving said heads axially of said disk; and means for moving at least one of said heads radially of said disk.

7. Apparatus as defined in claim 6, wherein said means for moving said heads axially of said disk includes electromagnet means.

8. Apparatus as defined in claim 6, wherein said one head is movable radially toward and away from the axis of said disk and said means for moving said one head axially is arranged to move said one head away from said disk prior to radial movement of said one head in a direction from the axis of said disk.

9. Apparatus as defined in claim 6, wherein said means for moving said one head radially of said disk comprises a feed screw mounted in said supporting means, a spindle nut in mesh with said feed screw, and motor means for rotating said feed screw.

10. Apparatus as defined in claim 9, wherein said disk is provided with a plurality of concentric first tracks and said one head is said first head, and further comprising selector means actuatable to control said motor means so as to move said first head into register with a preselected first track.

11. Apparatus as defined in claim 6, wherein said first track has portions of different optical density and said first head comprises a source of light, said second track including a helical sound groove having an outer end and said first head constituting said one head, and further comprising separable coupling means connecting said heads for simultaneous movement radially of said disk, said sound reproducing means further including means for effecting a disengagement of said coupling means in response to scanning of the outer end of said second groove by said second head.

12. Apparatus as defined in claim 6, wherein said first track includes an endless groove and said second track includes a helical sound groove having an outer end, said means for moving said one head radially of said disk including a carriage movable radially of said disk and supporting said second head, means for biasing said carriage radially outwardly, stop means for arresting said carriage in a position in which said second head registers with the outer end of said second groove, and means for moving said carriage radially inwardly against the opposition of said biasing means.

13. Apparatus as defined in claim 12, wherein said means for moving said carriage radially inwardly comprises a feed screw, motor means for rotating said feed screw, and a spindle nut provided on said carriage and movable into mesh with said feed screw.

14. Apparatus as defined in claim 12, wherein said sound groove has an inner end portion and said sound reproducing means further includes means for actuating said means for moving said second head axially of said disk in response to scanning by said second head of the inner end portion of said second groove.

15. Apparatus as defined in claim 12, wherein said sound groove has a plurality of sound sequences superimposed upon each other in accordance with the carrier frequency method and includes an inner end portion, said sound reproducing means further including means for effecting a movement of said second head into register with the outer end of said sound groove and for selecting a different sound sequence for scanning by said second head in response to scanning by said second head of the inner end of said sound groove.

16. Apparatus for simultaneously reproducing visible and audible information, particularly for educational and analogous purposes, comprising a disk having a plurality of concentric first tracks of recorded visible information and a plurality of concentric second tracks of recorded audible information, said first tracks being spaced from said second tracks as considered in the radial direction of said disk and each of said first tracks including a helical image groove having an outer end, each of said second tracks including a helical sound groove having an outer end and each of said sound grooves being associated with one of said image grooves; means for rotating said disk; image reproducing means including at least one first head arranged to scan said first tracks; sound reproducing means including at least one second head arranged to scan said second tracks simultaneously with scanning of said first tracks by said first head; means for supporting said first and second heads; means for simultaneously moving said first and second heads into register with the outer ends of selected image grooves and the associated sound grooves; and means for thereupon moving said heads simultaneously radially inwardly of said disk while said heads respectively scan the selected image and sound grooves, said sound reproducing means further including means for starting said means for moving said heads radially inwardly in response to scanning of the outer end of a selected sound groove by said second head.

17. Apparatus for simultaneously reproducing visible and audible information, particularly for educational and analogous purposes, comprising a disk having a plurality of concentric first tracks of recorded visible information and a plurality of concentric second tracks of recorded audible information, said first tracks being spaced from said second tracks as considered in the radial direction of said disk; means for rotating said disk; image reproducing means including a plurality of first heads spaced from each other in the circumferential direction of said disk and each movable radially of said disk into register with a selected first track; sound reproducing means including a plurality of second heads spaced from each other circumferentially of said disk and each movable radially of said disk into register with a selected second track to scan the selected second track simultaneously with scanning of the selected first track by the registering first head; and means for supporting said first and second heads.

18. Apparatus as defined in claim 17, wherein said supporting means includes a plurality of discrete supporting elements extending substantially radially of said disk and each supporting one of said first heads and one of said second heads.

19. Apparatus for simultaneously reproducing visible and audible information, particularly for educational and analogous purposes, comprising a disk having at least one first track of recorded visible information and at least one second track of recorded audible information, said first and second tracks being spaced from each other as considered in the radial direction of said disk; means for rotating said disk, including a turntable arranged to rotate said disk at 3,000 revolutions per minute; image reproducing means including at least one first head arranged to scan said first track; sound reproducing means including at least one second head arranged to scan said second track simultaneously with scanning of said first track by said first head; and means for supporting said first and second heads.

20. Apparatus for simultaneously reproducing visible and audible information, particularly for educational and analogous purposes, comprising a disk rotatable in a substantially horizontal plane and having at least one first track of recorded visible information and at least one second track of recorded audible information, said first and second tracks being spaced from each other as considered in the radial direction of said disk; means for rotating said disk; image reproducing means including at least one first head arranged to scan said first track; sound reproducing means including at least one second head arranged to scan said second track simultaneously with scanning of said first track by said first head, said first and second heads being located at a level above said disk; means for supporting said first and second heads, at least one of said heads being movable radially of said disk and each of said heads being movable axially of said disk; and means for indicating the distances between said one head and the axis of said disk.

* * * * *